3,172,885
3-THIOENOL ETHERS OF Δ⁴-PREGNENE-
16,17-ACETONIDES
Gerald W. Krakower, Elizabeth, N.J., and James W. Brown, Chicago, Ill., assignors to Olin Mathieson Chemical Corporation, New York, N.Y., a corporation of Virginia
No Drawing. Filed Dec. 5, 1963, Ser. No. 328,209
5 Claims. (Cl. 260—239.55)

This invention relates to and has as its objects the provision of new physiologically active steriods, methods for preparing the same, and new intermediates useful in said preparation.

The final products of this invention can be represented by the formula:

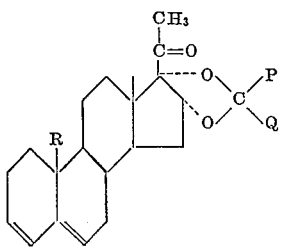

wherein R represents hydrogen or lower alkyl (e.g., methyl); P represents hydrogen, lower alkyl, halo lower alkyl, monocyclic cycloalkyl, monocyclic cycloalkyl lower alkyl, monocyclic aryl, monocyclic aryl lower alkyl, monocyclic heterocyclic or monocyclic heterocyclic lower alkyl; Q is lower alkyl, halo lower alkyl, monocyclic cyclo cycloalkyl, monocyclic cycloalkyl lower alkyl, monocyclic aryl, monocyclic aryl lower alkyl, monocyclic heterocyclic or monocyclic heterocyclic lower alkyl; or together with carbon to which they are joined P and Q is a monocyclic cycloalkyl or monocyclic heterocyclic radical.

The final products of this invention are physiologically active substances which possess progestational activity and hence can be used in lieu of known progestational agents, such as progesterone, in the treatment of habitual abortion. For this purpose, they can be administered in the same manner as progesterone, for example, the dosage being adjusted for the relative potency of the particular steroid. The compounds of this invention can also be administered perorally in the form of tablets.

In the most preferable embodiment of this invention, P is lower alkyl and Q is selected from the group consisting of lower alkyl (e.g. methyl) and monocyclic aryl (e.g. phenyl).

The final products of this invention are prepared according to the novel processes of this invention, which may be represented by the following equations wherein R, P and Q are as hereinbefore defined; and X is aryl, alkyl or aralkyl, (e.g. phenyl, ethyl or benzyl).

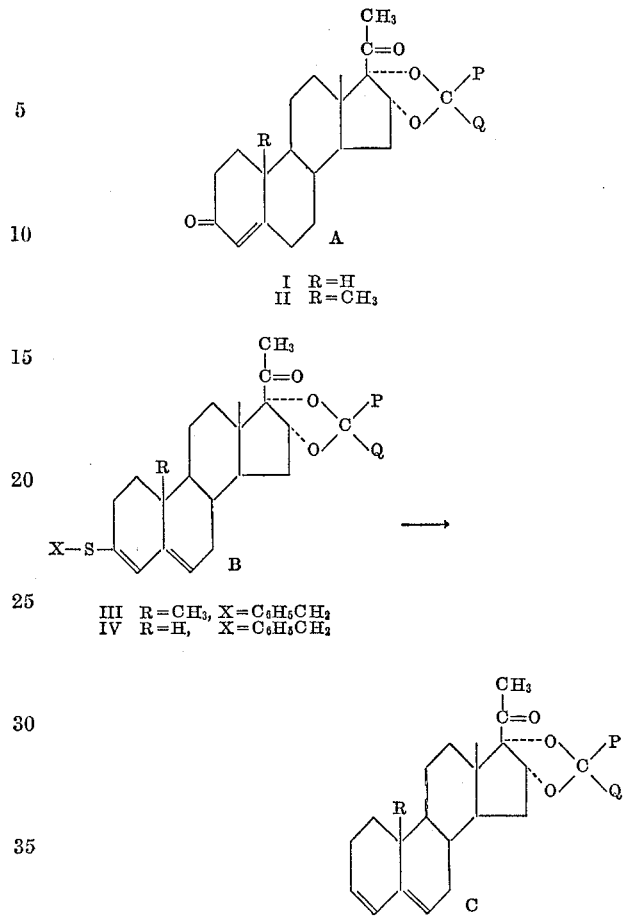

In the first step of this novel process, the 16α,17α-acetal or ketal derivatives of 16α,17α-dihydroxyprogesterone and 16α,17α-dihydroxy-19-norprogesterone (Compounds A) obtained as disclosed in U.S. Patent No. 3,048,581, issued August 7, 1962, in the name of Josef Fried, and in copending U.S. applications, Serial No. 129,234, filed August 4, 1961, in the names of Josef Fried and Mariano Andrew Guiducci and Serial No. 268,605, filed March 28, 1963, in the name of Patrick A. Diassi, respectively, are first treated with a mercaptan, for example, aryl mercaptan, e.g. phenyl mercaptan; aralkyl mercaptan, e.g. benzyl mercaptan; or alkyl mercaptan, e.g. ethyl mercaptan, to yield the 3-X-thioenol ethers, wherein X may be aryl, alkyl or aralkyl, (Compounds B), which are new compounds of this invention.

The 3-X-thioenol ethers may then be treated with a nickel catalyst, (e.g. sponge nickel, Raney nickel) in a suitable organic solvent to yield the Δ³,⁵-pregnadiene final products of this invention.

If a ketal or acetal grouping other than that present in the starting steroid reactant is desired, the starting product may be cleaved by treatment with aqueous formic acid to yield 16α,17α-dihydroxy intermediates of the formula:

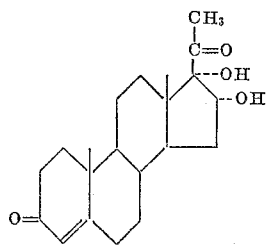

If concentrated aqueous formic acid is used (e.g., 90% formic acid), a 16-formic acid ester is formed, which is then hydrolyzed by treatment with 10% aqueous potassium carbonate in methanol to yield the free 16,17-dihydroxy steroid derivative.

These intermediates are then reacted with an aldehyde or ketone of the formula:

wherein P and Q are as hereinbefore defined. The reaction is preferably carried out by treating a suspension of solution of the dihydroxy steroid in the aldehyde or ketone (or an organic solvent and the aldehyde or ketone, if the aldehyde or ketone is a solid) with an acid catalyst (e.g. perchloric acid, p-toluenesulfonic acid, hydrochloric acid, and so forth), neutralizing the acid and recovering the acetal or ketal derivative formed.

Suitable aldehyde and ketone reactants include lower alkanals of at least two carbon atoms, such as paraldehyde, propanal and hexanal; di(lower alkyl)ketones, such as acetone, diethylketone, dibutylketone, methylethylketone, and methylisobutylketone; cycloalkanones, such as cyclobutanone, cyclopentanone, cyclohexanone, suberone, and cyclodexanone; cycloalkyl (lower alkanals), such as cyclopropylcarboxaldehyde, cyclobutylcarboxaldehyde, cyclopentylcarboxaldehyde, cyclohexylcarboxaldehyde, cycloheptylcarboxaldehyde, cyclooctylcarboxaldehyde, cyclopropylacetaldehyde, cyclobutylacetaldehyde, cyclopentylacetaldehyde, cyclohexylacetaldehyde, β-cyclo-pentylpropionaldehyde, γ-cyclohexylbutyraldehyde, and 3-cyclopropyl caproaldehyde; cycloalkyl (lower alkanones), such as cyclopropyl methyl ketone, cyclobutyl ethyl ketone, cyclopentyl propyl ketone, cyclopentylmethyl methyl ketone, cyclohexylmethyl ethyl ketone, cyclopentylethyl ethyl ketone, cyclopropylpropyl methyl ketone, cyclohexyl n-pentyl ketone, cyclohexyl methyl ketone, and cyclooctyl methyl ketone; dicycloalkyl ketones, such as dicyclopropyl ketone, dicyclobutyl ketone, dicyclopentyl ketone, dicyclohexyl ketone, cyclopentyl cyclohexyl ketone, cyclopropylmethyl cyclopropyl ketone, 2-cyclobutylethyl cyclopropyl ketone, 3-cyclopentylmethyl cyclopentyl ketone, 5-cyclohexylhexyl cyclohexyl ketone, di(cyclopentylmethyl) ketone, cyclohexylmethyl cyclopentyl ketone, and di(4-cyclohexylpentyl) ketone; cycloalkyl monocyclic aromatic ketones, such as cyclopropyl phenyl ketone, cyclohexyl p-chlorophenyl ketone, cyclopentyl o-methoxyphenyl ketone, cyclopentyl o,p-dihydroxyphenyl ketone, cyclohexyl m-tolyl ketone, cyclopropyl p-ethylphenyl ketone, cyclopropyl p-nitrophenyl ketone, and cyclohexyl p-actamidophenyl ketone; cycloalkyl(lower alkyl) monocyclic aromatic ketones, such as cyclopentylmethyl phenyl ketone; cycloalkyl monocyclic aromatic (lower alkyl) ketones, such as cyclopentyl benzyl ketone, cyclohexyl phenethyl ketone, and cyclobutyl benzyl ketone; cycloalkyl (lower alkyl) monocyclic aromatic (lower alkyl) ketones, such as cyclopentylmethyl benzyl ketones; cycloalkyl monocyclic heterocyclic ketones, such as cyclopentyl 2-furyl ketone, cyclohexyl 2-thienyl ketone, and cyclopropyl 2-pyridinyl ketone; cycloalkyl (lower alkyl) monocyclic heterocyclic ketones, such as cyclopentylmethyl 2-piperidinyl ketone, cyclohexylethyl 2-morpholinyl ketone and cyclopropyl 2-thienyl ketone; cycloalkyl monocyclic heterocylic (lower alkyl) ketones, such as cyclopentyl thenyl ketone, cyclohexyl furfuryl ketone and cyclopropyl 2-piperidinylmethyl ketone; halo-lower alkanals, such as chloral hydrate, trifluoroacetaldehyde hemiacetal, and heptafluorobutanal ethyl hemiacetal; halo-lower alkanones, such as 1,1,1-trifluoroacetone; monocyclic carbocyclic aromatic aldehydes such as benzaldehyde, halobenzaldehydes (e.g. p-chlorobenzaldehyde and p-fluorobenzaldehyde), lower alkoxybenzaldehydes (e.g. o-anisaldehyde), di(lower alkoxy)benzaldehydes (e.g. veratraldehyde), hydroxybenzaldehydes (e.g., salicylaldehyde), dihydroxybenzaldehydes, (e.g. resorcyaldehyde), lower alkyl benzaldehydes (e.g. m-tolualdehyde and p-ethylbenzaldehyde), di(lower alkyl)benzaldehydes (e.g. o,p-dimethylbenzaldehyde), nitrobenzaldehydes, acylamidobenzaldehydes (e.g. N-acetylanthranilaldehyde), and cyanobenzaldehydes; monocyclic carboxylic aromatic lower alkanals, such as phenylacetaldehyde, α-phenylpropionaldehyde, β-phenylpropionaldehyde, γ-phenylbutylraldehyde, and aromatically-substituted halo lower alkoxy, hydroxy, lower alkyl, nitro, acylamido and cyano derivatives therefo; monocyclic heterocyclic aldehydes, such as picolinaldehydes, furfural, thiophene carbonals, and halo, lower alkoxy, hydroxy, lower alkyl, nitro, and cyano derivatives thereof; monocyclic heterocyclic lower alkanals; monocyclic carbocyclic aromatic ketones, such as acetophenone, α,α,α-trifluoroacetophenone, propiophenone, butyrophenone, valerophenone, isocaprophenone halopheny lower alkyl ketones (e.g. p-chloroacetophenone and p-chloropropiophenone), (lower alkoxy) phenyl lower alkyl ketones (e.g. p-anisyl methyl ketone), di(lower alkoxy)phenyl lower alkyl ketones, hydroxyphenyl lower alkyl ketones, dihydroxyphenyl lower alkylketone (e.g. resacetophenone), (lower alkyl) phenyl lower alkyl ketones (e.g. methyl p-tolyl ketone), di(lower alkyl)phenyl lower alkyl ketones (o,p-xylyl methyl ketone), nitrophenyl lower alkyl ketones (e.g. p-nitroacetophenone), acylamidophenyl lower alkyl ketones (e.g. acetyl anilines), and cyanophenyl lower alkyl ketones; benzophenone, and mono or bis substituted halo, lower alkoxy, hydroxy, lower alkyl, nitro, acylamido and cyano derivatives thereof; monocyclic carbocylic aromatic lower alkanones, such as 1-phenyl-3-butanone and 1-phenyl-4-pentanone, and aromatically substituted derivatives thereof; monocyclic heterocylic ketones, such as 2-acetylfuran, 2-benzoylfuran, 2-acetylthiophene and alloxan; and monocyclic heterocyclic lower alkanones.

The invention may be illustrated by the following examples:

EXAMPLE 1

*3-benzylthioenol ether of $\Delta^4$-pregnene-16α,17α-diol-3,20-dione 16,17-acetonide*

A solution of 300 mg. of $\Delta^4$-pregnene-16α,17α-diol-3,20-dione 16,17-acetonide 18 ml. of dry benzene containing 1 ml. of absolute ethanol, 0.3 ml. of benzylmercaptan and 50 mg. of pyridine hydrochloride is heated at reflux for three hours. The reaction mixture is cooled, diluted with ether and washed with 5% sodium carbonate solution and water, dried over magnesium sulfate and evaporated to give 280 mg. of crude material. Recrystallization from methanolchloroform gives 80 mg. of material, M.P. 158–161° C., whose mother liquors consist mostly of starting material. A second recrystallization from methanol gives 59 mg. of analytically pure benzylthioenol ether, M.P. 166–167° C., $[\alpha]_D^{20}$ −70.6°.

*Analysis.*—Calc'd for $C_{31}H_{40}O_3S$: C, 75.58; H, 8.18. Found: C, 75.58; H, 8.19.

Similarly, following the procedure of Example 1 but substituting 19-nor-$\Delta^4$-pregnene-16α,17α-diol-3,20-dione 16,17-acetonide for $\Delta^4$-pregnene-16α,17α-diol-3,20-dione 16,17-acetonide there is obtained the 3-benzylthioenol ether of 19-nor-$\Delta^4$-pregnene-16α,17α-diol-3,20-dione 16,17-acetonide.

Similarly, following the procedure of Example 1 but substituting ethyl mercaptan or phenyl mercaptan for benzyl mercaptan there is obtained the 3-ethylthioenol ether and the 3-phenylthioenol ether of $\Delta^4$-pregnene-16$\alpha$,17$\alpha$-diol-3,20-dione 16,17-acetonide, respectfully.

EXAMPLE 2

$\Delta^{3,5}$-pregnadiene-16$\alpha$,17$\alpha$-diol-20-one 16,17-acetonide

A solution of the 3-benzylthioenol ether of $\Delta^4$-pregnene-16$\alpha$,17$\alpha$-diol-3,20-dione 16,17-acetonide (9 mg.) is refluxed with sponge nickel catalyst in 10 ml. of acetone for two hours. The nickel is removed by filtration and the residue evaporated to give 7 mg. of crude $\Delta^{3,5}$-pregnadiene-16$\alpha$,17$\alpha$-diol-20-one 16,17-acetonide. The UV spectrum shows characteristic triple peaks of a $\Delta^{3,5}$-diene at 228, 236 and 244 m$\mu$.

Similarly, following the procedure of Example 2 but substituting the 3-benzylthioenol ether of 19-nor-$\Delta^4$-pregnene-16$\alpha$,17$\alpha$,diol-3,20-dione 16,17-acetonide for the benzythioenol ether of $\Delta^4$-pregnene-16$\alpha$,17$\alpha$-diol-3,20-dione 16,17-acetonide there is obtained 19-nor-$\Delta^{3,5}$-pregnadiene-16$\alpha$,17$\alpha$-diol-20-one 16,17-acetonide.

EXAMPLE 3

3-benzylthioenol ether of $\Delta^4$-pregnene-61$\alpha$,17$\alpha$-diol-3,20-dione 16,17-acetophenonide A solution of 250 mg. of $\Delta^4$-pregnene-16$\alpha$,17$\alpha$-diol-3,20- dione 16,17-acetophenonide in 10 ml. of dry benzene containing 0.8 ml. of absolute ethanol, 0.02 ml. of benzylmercaptan, and 42 mg. of pyridine hydrochloride is refluxed overnight. The reaction mixture is cooled, diluted with ether and washed with 5% sodium hydroxide and water and dried over magnesium sulfate. Evaporation of the solvent and drying under vacuum gives 264 mg. of crude 3-benzylthioenol ether of $\Delta^4$-pregnene-16$\alpha$,17$\alpha$-diol-3,20-dione 16,17-acetophenonide, $\lambda_{max.}^{EtOH}$ 268 m$\mu$ ($\epsilon = 17,800$)

Similarly, following the procedure of Example 3 but substituting 19-nor-$\Delta^4$-pregnene-16$\alpha$,17$\alpha$-diol-3,20-dione 16,17-acetophenonide for $\Delta^4$-pregnene-16$\alpha$,17$\alpha$-diol-3,20-dione 16,17-acetophenonide there is obtained the 3-benzylthioenol ether of 19-nor-$\Delta^4$-pregnene-16$\alpha$,17$\alpha$-diol-3,20-dione 16,17-acetophenonide.

EXAMPLE 4

$\Delta^{3,5}$-pregnadiene-16$\alpha$,17$\alpha$-diol-20-one 16,17-acetophenonide A solution of 586 mg. of crude 3-benzylthioenol ether of $\Delta^4$-pregnene-16$\alpha$,17$\alpha$-diol-3,20-dione 16,17-acetophenonide in 250 ml. of acetone containing 20 ml. of sponge nickel catalyst is refluxed under helium for three hours. The reaction mixture is cooled, the nickel catalyst removed by filtration and the solvent evaporated. During the work-up and following crystallization, the material is protected from exposure to atmospheric oxygen. Recrystallization from ether gives 45 mg. of $\Delta^{3,5}$-pregnadiene-16$\alpha$,17$\alpha$-diol-20-one 16,17-acetophenonide, M.P. 167–169° C. (dec.), $[\alpha]_D^{22}$ —134.5°, $\lambda_{max.}^{EtOH}$ 229 m$\mu$ ($\epsilon = 17,700$), 236 m$\mu$ ($\epsilon = 19,200$), 245 m$\mu$ ($\epsilon = 17,400$)

The analytical sample also has a melting point of 167–169° C., but the $\lambda_{max.}^{EtOH}$ 236 m$\mu$ increases to $\epsilon = 25,500$

*Analysis.*—Calc'd for $C_{29}H_{36}O_3$: C, 80.51; H, 8.39. Found: C, 80.55; H, 8.52.

Similarly, following the procedure of Example 4 but substituting 3-benzylthioenol ether of 19-nor-$\Delta^4$-pregnene-16$\alpha$,17$\alpha$-diol-3,20-dione 16,17-acetophenonide for the 3-benzylthioenol ether of $\Delta^4$-pregnene-16$\alpha$,17$\alpha$-diol-3,20-dione 16,17-acetophenonide there is obtained 19-nor-$\Delta^{3,5}$-pregnadiene-16$\alpha$,17$\alpha$-diol-20-one 16,17-acetophenonide.

The invention may be variously otherwise embodied within the scope of the appended claims.

What is claimed is:

1. A compound of the formula:

wherein R is selected from the group consisting of hydrogen and methyl; X is selected from the group consisting of lower alkyl, phenyl and benzyl; P is selected from the group consisting of hydrogen, lower alkyl, halo lower alkyl, monocyclic cycloalkyl, monocyclic cycloalkyl lower alkyl, monocyclic aryl, monocyclic aryl lower alkyl, monocyclic heterocyclic and monocyclic heterocyclic lower alkyl; Q is selected from the group consisting of lower alkyl, halo lower alkyl, monocyclic cycloalkyl, monocyclic cycloalkyl lower alkyl, monocyclic aryl, monocyclic aryl lower alkyl, monocyclic heterocyclic and monocyclic heterocyclic lower alkyl; and together with the carbon to which they are joined P and Q is selected from the group consisting of monocyclic cycloalkyl and monocyclic heterocyclic.

2. 3-benzylthioenol ether of $\Delta^4$-pregnene-16$\alpha$,17$\alpha$-diol-3,20-dione 16,17-acetonide.

3. 3-benzylthioenol ether of $\Delta^4$-pregnene-16$\alpha$,17$\alpha$-diol-3,20-dione 16,17-acetophenonide.

4. 3-benzylthioenol ether of 19 - nor - $\Delta^4$ - pregnene-16$\alpha$,17$\alpha$-diol-3,20-dione 16,17-acetonide.

5. 3-benzylthioenol ether of 19 - nor - $\Delta^4$ - pregnene-16$\alpha$,17$\alpha$-diol-3,20-dione 16,17-acetophenonide.

References Cited by the Examiner

Romo et al.: J.A.C.S., 73 pp. 1528–33 (1951).

LEWIS GOTTS, *Primary Examiner.*